US011606264B2

United States Patent
Erta et al.

(10) Patent No.: US 11,606,264 B2
(45) Date of Patent: Mar. 14, 2023

(54) APPLICATION OF NETWORK LAYER FEC DURING PREDICTED NETWORK EVENTS

(71) Applicant: Cisco Technology, Inc., San Jose, CA (US)

(72) Inventors: Alessandro Erta, Licciana Nardi (IT); Rupak Chandra, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 170 days.

(21) Appl. No.: 17/210,953

(22) Filed: Mar. 24, 2021

(65) Prior Publication Data

US 2022/0311674 A1    Sep. 29, 2022

(51) Int. Cl.
| | |
|---|---|
| *H04L 41/147* | (2022.01) |
| *H04L 1/00* | (2006.01) |
| *H04W 64/00* | (2009.01) |
| *H04L 43/16* | (2022.01) |
| *G16Y 10/75* | (2020.01) |

(52) U.S. Cl.
CPC .......... *H04L 41/147* (2013.01); *H04L 1/0061* (2013.01); *H04L 43/16* (2013.01); *H04W 64/00* (2013.01); *G16Y 10/75* (2020.01)

(58) Field of Classification Search
CPC ..... H04L 41/147; H04L 1/0061; H04L 43/16; H04L 41/145; H04W 64/00; G16Y 10/75
USPC ........................................................ 370/252
See application file for complete search history.

(56) References Cited

U.S. PATENT DOCUMENTS

| | | | |
|---|---|---|---|
| 6,772,388 B2 | 8/2004 | Cooper et al. | |
| 7,940,777 B2 | 5/2011 | Asati et al. | |
| 10,904,805 B1 | 1/2021 | Sheriff et al. | |
| 2005/0009523 A1 | 1/2005 | Pekonen | |
| 2005/0229074 A1* | 10/2005 | Chawla | H04L 12/1868 714/758 |
| 2006/0140125 A1* | 6/2006 | Ottinger | H04L 41/145 370/310 |

(Continued)

FOREIGN PATENT DOCUMENTS

| | | | | |
|---|---|---|---|---|
| EP | 3657809 B1 * | 12/2021 | ............. | H04H 20/18 |
| WO | 2020255040 | 12/2020 | | |

OTHER PUBLICATIONS

"Taking Forward Error Correction (FEC) to the Next Level", online: https://www.silver-peak.com/sites/default/files/infoctr/silver-peak_wp_fec.pdf, White Paper, Apr. 30, 2006, 5 pages, Silver Peak Systems, Inc.

(Continued)

*Primary Examiner* — Rownak Islam
(74) *Attorney, Agent, or Firm* — Behmke Innovation Group LLC; Kenneth J. Heywood; Jonathon P. Western

(57) ABSTRACT

In one embodiment, a controller predicts an occurrence of an event in a wireless network, based in part on a movement of a mobile node of the wireless network. The controller initiates application of network-layer forward error correction encoding to a stream of packets to be sent during the event between the mobile node and an access point of the wireless network, to form one or more encoded packets. The controller causes the one or more encoded packets to be transmitted in conjunction with the stream of packets during the event. The controller ceases application of the network-layer forward error correction encoding after the event has occurred.

20 Claims, 9 Drawing Sheets

(56) References Cited

U.S. PATENT DOCUMENTS

2012/0226955 A1    9/2012   Norair
2015/0249835 A1    9/2015   Yie et al.

OTHER PUBLICATIONS

"Forward Error Correction (FEC)", online: https://www.tutorialspoint.com/forward-error-correction-fec, accessed Mar. 9, 2021, 1 page.
Kulkarni, et al., "Forward Error Correction based Encoding Technique for Cross-layer Multi Channel MAC Protocol", Energy Procedia 117 (2017), Mar. 2017, pp. 847-854, Elsevier.
Murphy, Rick, "Understanding OFDM—Part 3—Refresh", online: https://www.wirelesstrainingsolutions.com/understanding-ofdm-part-3-refresh/, Oct. 2016, accessed Mar. 9, 2021, 15 pages, Wireless Training & Solutions.
"Wi-Fi: Overview of the 802.11 Physical Layer and Transmitter Measurements", online: www.tektronix.com/wifi, Nov. 2013, 44 pages.
Chen, Xiaomin, "Coding in 802.11 WLANs", Doctor of Philosophy Dissertation, Hamilton Institute, National University of Ireland Maynooth, Sep. 2012, 120 pages, Ireland.
Riemann, et al., "Improving 802.11 Range with Forward Error Correction", Technical Report, MIT-C, SAIL-TR-2005-011, Dec. 2005, 6 pages, Massachusetts Institute of Technology.
Choi, Sunghyun, "IEEE 802.11E MAC-Level FEC Performance Evaluation and Enhancement", Global Telecommunications Conference, 2002. Globecom '02. IEEE, Nov. 2002, 5 pages, IEEE.

\* cited by examiner

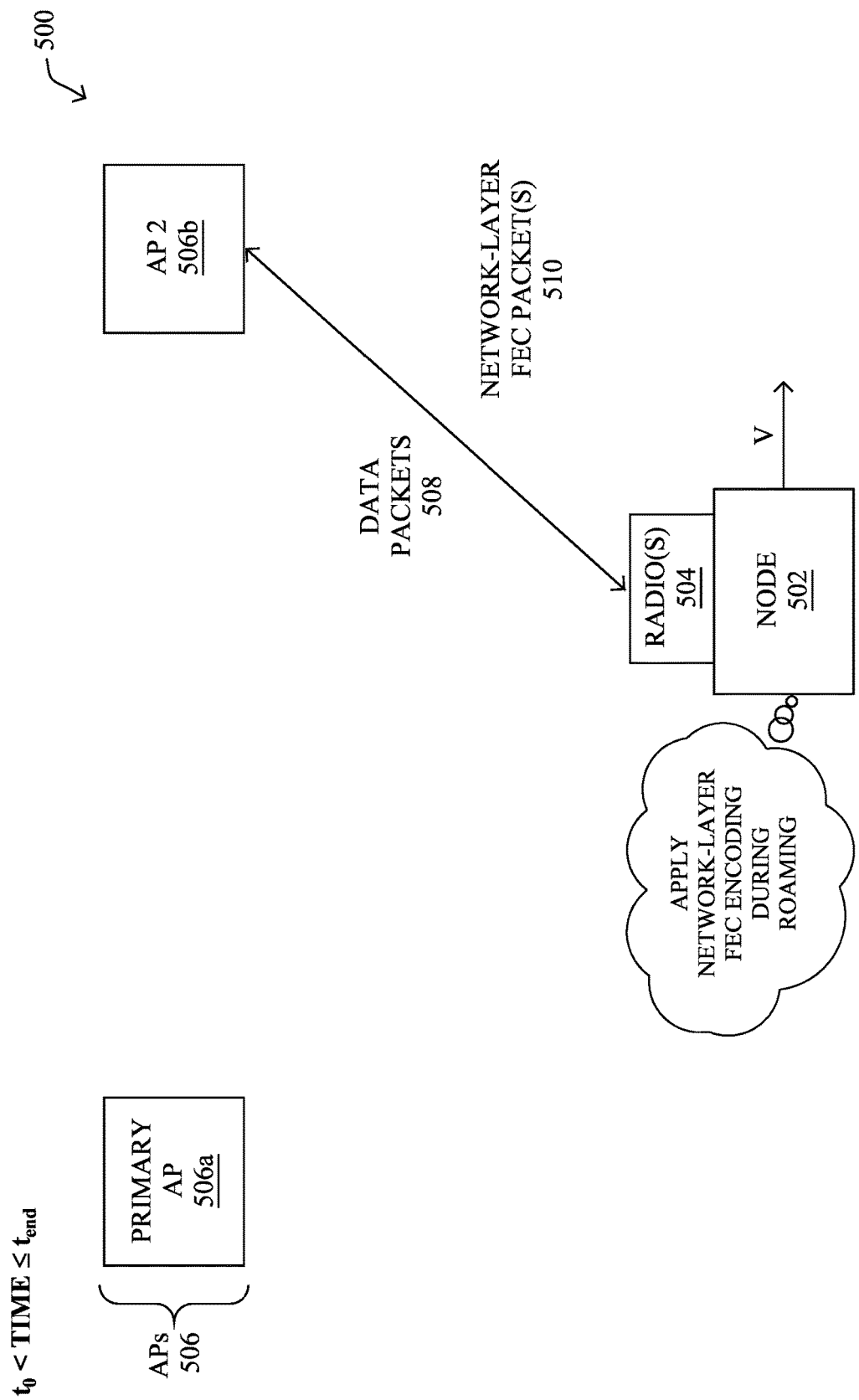

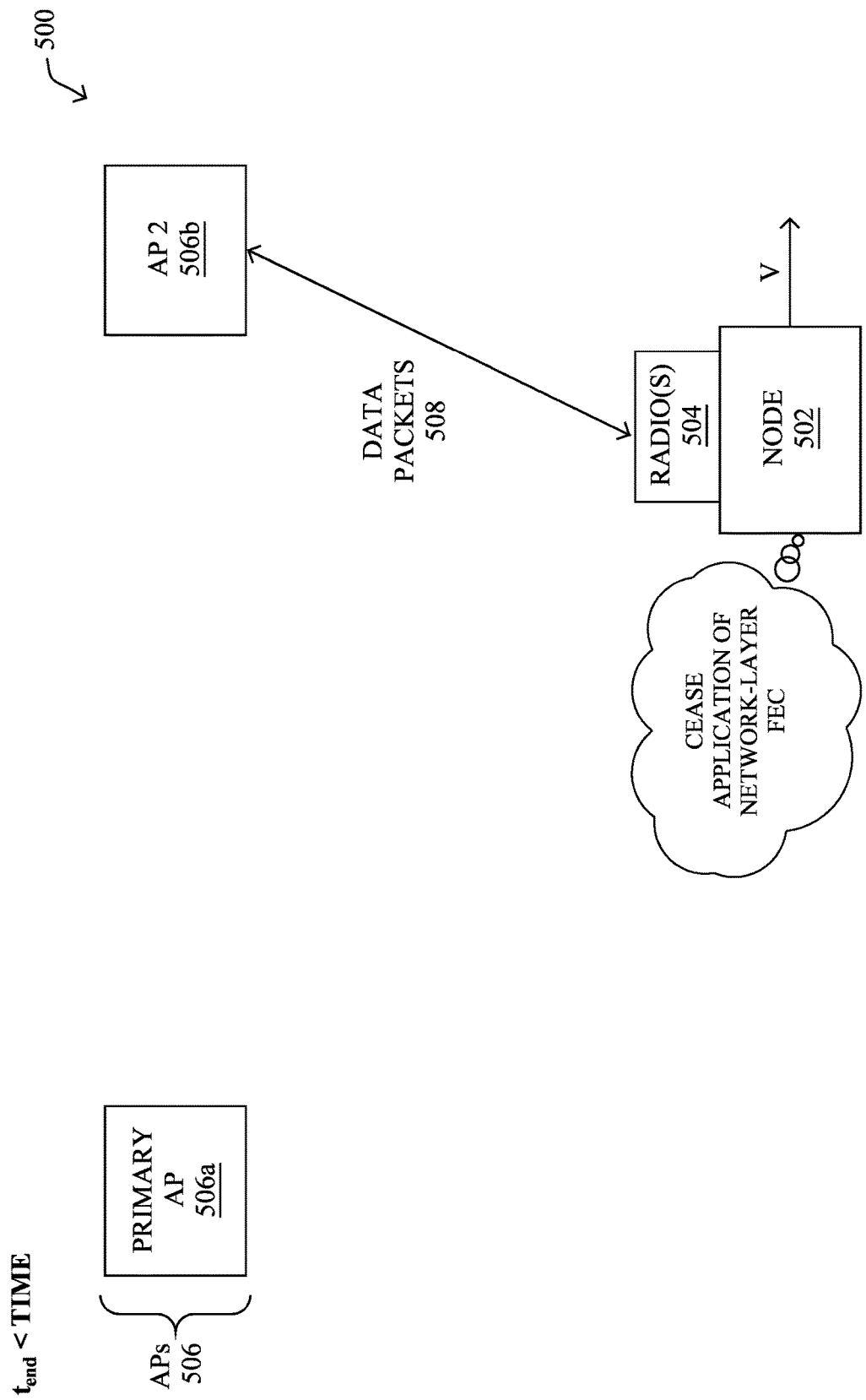

APPLICATION OF NETWORK LAYER FEC DURING PREDICTED NETWORK EVENTS

TECHNICAL FIELD

The present disclosure relates generally to computer networks, and, more particularly, to the application of network-layer forward error correction (FEC) during predicted network events.

BACKGROUND

As wireless access points become increasingly ubiquitous, more and more access points are being deployed in non-traditional settings, such as industrial and transportation settings. For instance, some mines now rely on wireless network deployments to monitor the mining process and the fleet of vehicles moving throughout a mine. This allows the operator of the mine to quickly identify problems, such as a broken down truck or other issues that may arise. Similarly, factory and warehouse operators are increasingly relying on wireless networks to control their devices, such as mobile robots, sensors and actuators, and the like.

In contrast to wireless networks deployed to traditional locations (e.g., office buildings, schools, etc.), non-traditional wireless network deployments may be subject to various conditions that can affect the radio frequency (RF) signals in the area. For instance, the high presence of metal in a mine could lead to severe signal degradation and blockage. In addition, nodes in these networks (e.g., trucks, trains, etc.) may be highly dynamic as they move throughout the area. This can also lead to signal fading and congestion due to interference. In extreme cases, the environmental factors can impinge on the wireless communications to such a degree that the controlled process is interrupted. Indeed, if a controlled node is unable to communicate with the wireless network, that node will be unable to receive control commands or report data back to its supervisory service.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5D illustrate an example of using network-layer forward error correction (FEC) encoding during an event.

DESCRIPTION OF EXAMPLE EMBODIMENTS

Overview

Figure 1:
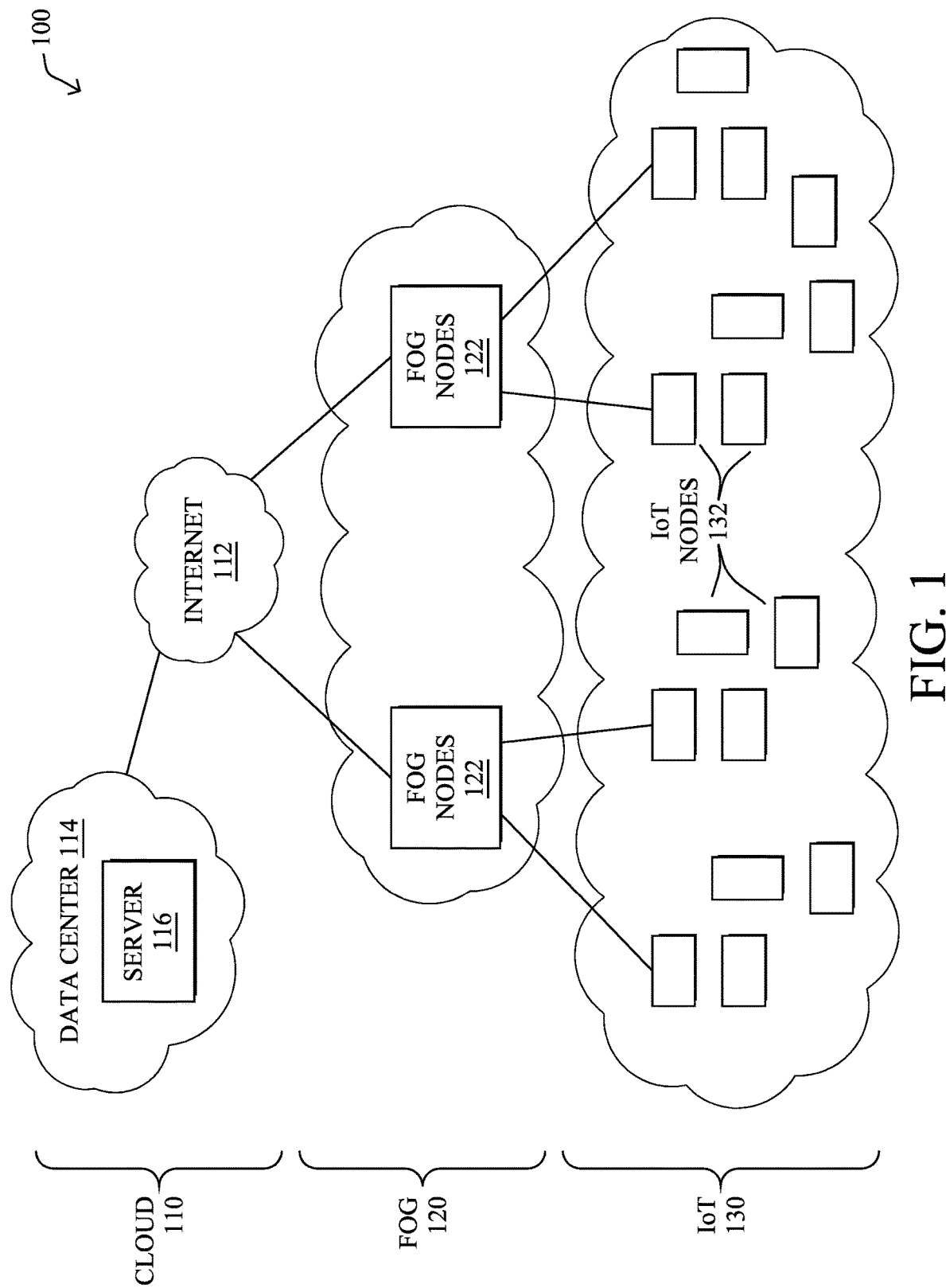
FIG. 1 illustrate an example computer network.

According to one or more embodiments of the disclosure, a controller predicts an occurrence of an event in a wireless network, based in part on a movement of a mobile node of the wireless network. The controller initiates application of network-layer forward error correction encoding to a stream of packets to be sent during the event between the mobile node and an access point of the wireless network, to form one or more encoded packets. The controller causes the one or more encoded packets to be transmitted in conjunction with the stream of packets during the event. The controller ceases application of the network-layer forward error correction encoding after the event has occurred.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely a cloud layer 110, a fog layer 120, and an IoT device layer 130. Illustratively, cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
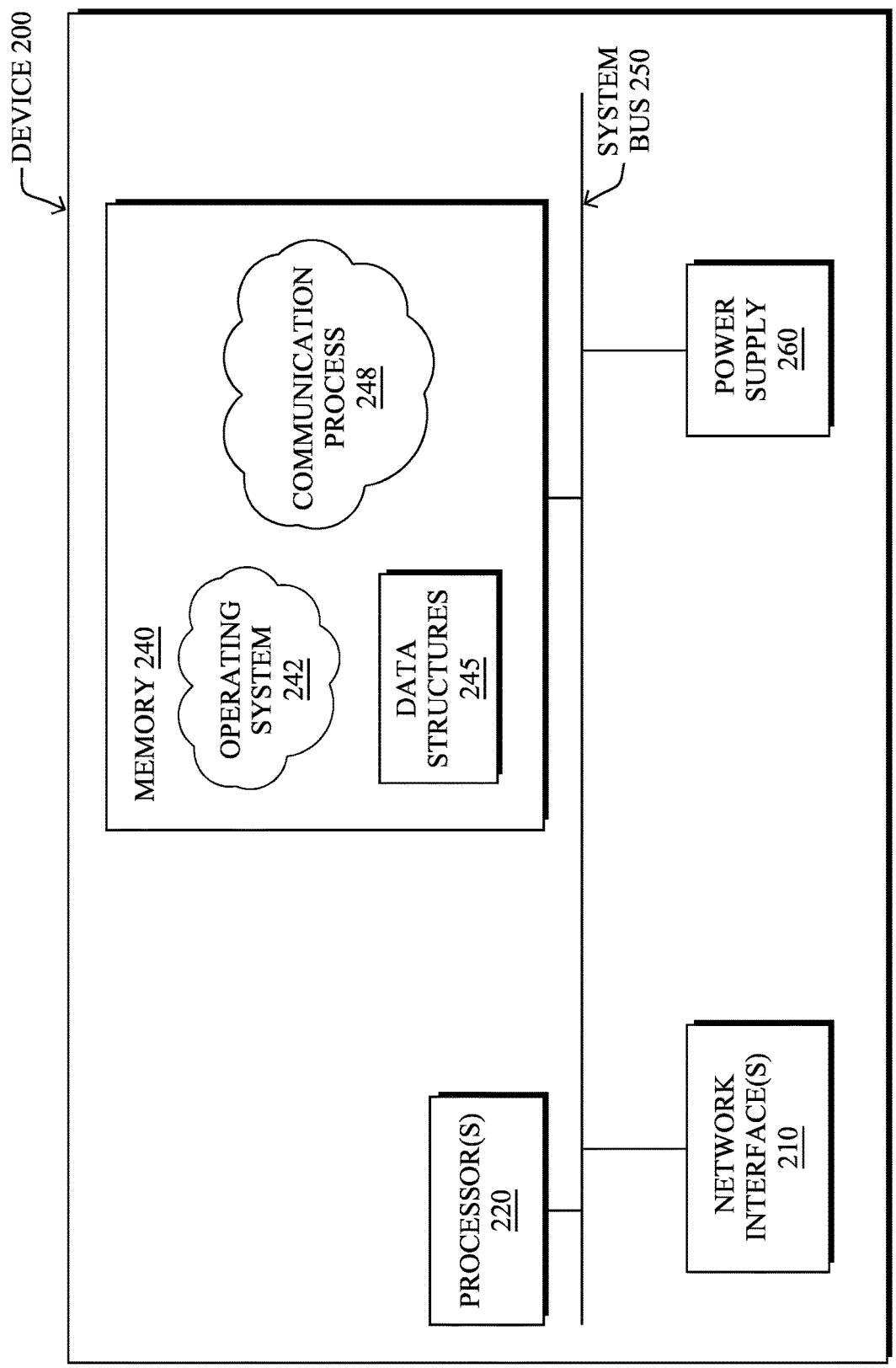
FIG. 2 illustrates an example network device/node.

FIG. 2 is a schematic block diagram of an example node/device 200 (e.g., an apparatus, controller, etc.) that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative communication process 248, as described herein. Note that while communication process 248 is shown in centralized memory 240 alternative embodiments provide for the process to be specifically operated within the network interface(s) 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, as detailed further below, communication process 248 may also include computer executable instructions that, when executed by processor(s) 220, cause device 200 to perform the techniques described herein. To do so, in some embodiments, communication process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, communication process 248 may employ one or more supervised, unsupervised, or semi-supervised machine learning models. Generally, supervised learning entails the use of a training set of data that is used to train the model to apply labels to the input data. For example, the training data may include sample telemetry that has been labeled as being indicative of an acceptable performance or unacceptable performance in a wireless network. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that communication process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Figure 3:
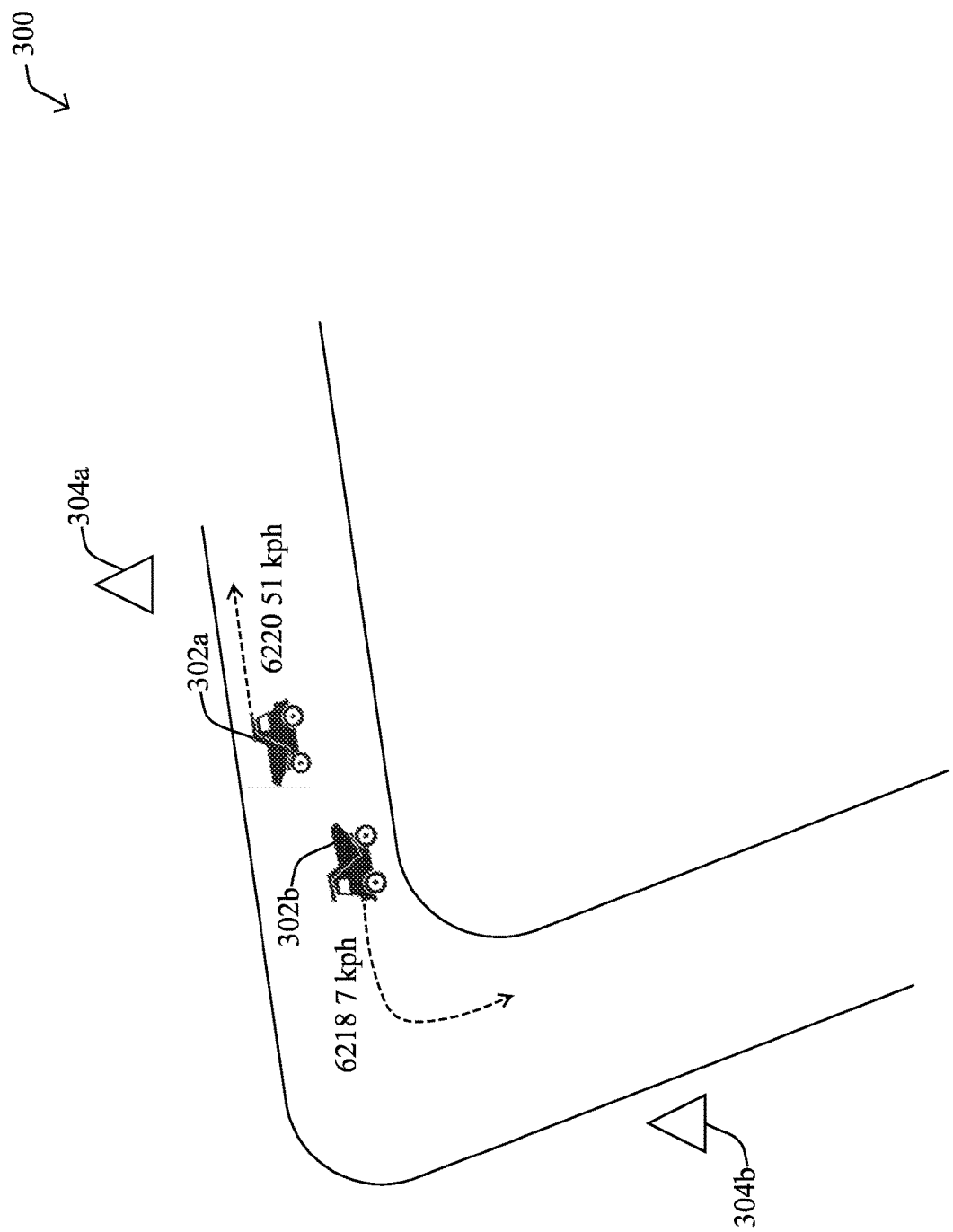
FIG. 3 illustrates an example industrial wireless network deployed in a mine.

As noted above, many IoT networks are implemented as wireless meshes. For instance, FIG. 3 illustrates an example industrial network 300. As shown, a number of vehicles 302a-302b may be deployed to the location of industrial network 300. For example, if the deployment location of industrial network 300 is a mine, vehicles 302a-302b may be autonomous trucks or carts. Each of vehicles 302a-302b may include its own hardwired network, such as a Controller Area Network (CAN) Bus, Ethernet, or the like, that allow the various components of the vehicle to communicate with one another. For example, a plurality of sensors on vehicle 302a may send sensor readings to an onboard navigation system that controls the steering and acceleration of vehicle 302a within the deployment location of wireless network 300 via a local, hardwired network of vehicle 302a.

Distributed throughout the deployment location of wireless network 300 may be any number of wireless access points 304, such as wireless access points 304a-304b, that form a wireless mesh network. In some embodiments, the access points 304 may be autonomous access points that self-organize into a wireless mesh. For example, certain access points 304 may function as mesh access points (MAPs) and arrange themselves into a wireless mesh rooted at a root access point (RAP). In alternative deployments, access points 304a-304b may be connected to one another, and/or a supervisory device, via a hardwired network backend.

Preferably, each of the mobile nodes in wireless network 300, such as vehicles 302a-302b, may include a plurality of radios/transceivers. This allows a particular vehicle 302 to attach/associate with a particular access point 304 using a first one of its radios/transceivers over a certain wireless channel. In addition, the additional radio(s) of the vehicle 302 may also form a link with the same access point 304 on a different channel and/or to one or more other access points 304. For instance, as shown, vehicle 302b may communicate with access point 304a using a first radio and may also communicate with access point 304b using a different radio. Doing so affords vehicle 302b multiple communication paths to the backend infrastructure through the use of spatially diverse access points 304.

The process by which a vehicle 302 detaches from an access point 304 and forms a new link with a different access point 304 is known as roaming. This process may be repeated any number of times, as a vehicle 302 moves throughout the area. Typically, the decision to roam from the current access point 304 being used by a vehicle 302 to another access point 304 is made by comparing the radio signal quality metrics for the access points to one or more roaming thresholds. Notably, if the received signal strength indicator (RSSI), signal-to-noise (SNR) ratio, or the like, crosses the roaming threshold, the vehicle 302 may roam to another access point 304. For example, as vehicle 302*b* moves away from access point 304*a*, its measured RSSI with access point 304*a* may drop below the defined roaming threshold, leading vehicle 302*b* to roam to another access point 304, such as access point 304*b*.

Figure 4:
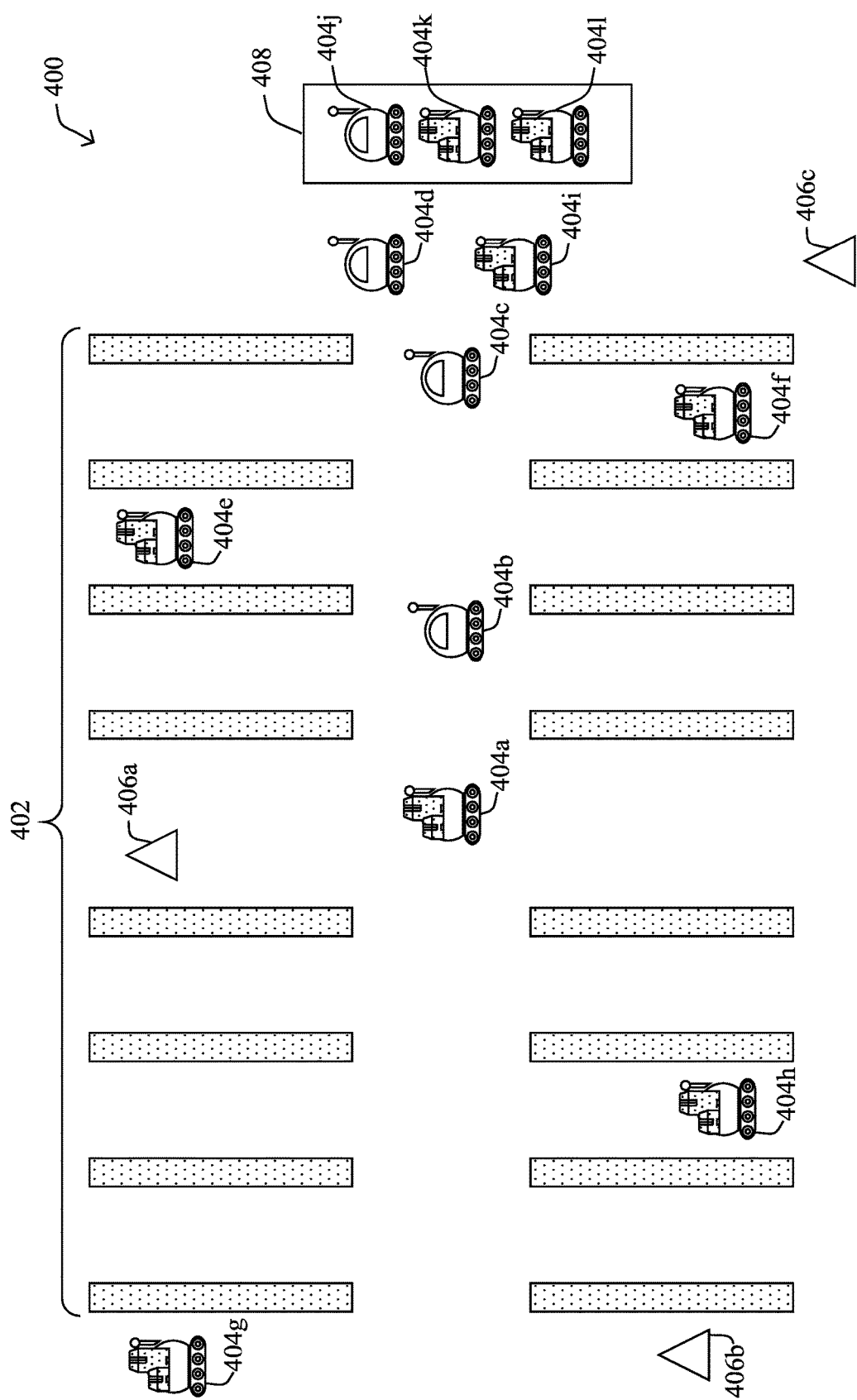
FIG. 4 illustrates an example industrial wireless network deployed in a warehouse.

FIG. 4 illustrates another example warehouse 400 deployed in a warehouse, in various embodiments. As shown, assume that a plurality of inventory racks 402 are distributed throughout warehouse 400 is located for purposes of storing items. As would be appreciated, inventory racks 402 are optional and other forms of storage systems may be deployed throughout warehouse 400, in other cases. For instance, warehouse 400 may also include containers, holding pens, or the like, in which various items may be stored.

To aid in the storage and/or retrieval of the items in the warehouse, any number of mobile robots 404 may be deployed, such as mobile robots 402*a*-404*l* shown. In general, each mobile robot 404 may include a propulsion system that propels the robot (e.g., an engine coupled to wheels, treads, etc.), one or more sensor systems (e.g., infrared, sonar, video, etc.), a communication system (e.g., wireless, hardwired port, etc.), and a computer control system coupled to the other systems that provides supervisory control over the other systems. In some embodiments, mobile robots 404 may also include mechanisms to automatically load and/or unload items, such as forklifts, mechanical claws, or the like. In other embodiments, mobile robots 404 may require the assistance of human workers to load and unload items to and from them, such as at a pack-out area 408.

In some instances, mobile robots 404 may be partially or fully autonomous, allowing them to complete their tasks, independently. For instance, a particular mobile robot 404 may be sent a task list that indicates the set of items that the robot is to retrieve from within warehouse 400, navigation information if so needed, or any other information that may be required for the performance of its retrieval functions. To this end, warehouse 400 may also include a wireless network that comprises access points 406, such as access points 406*a*-406*c*.

Similar to the example in FIG. 3, each mobile robot 404 in FIG. 4 may include a plurality of radios/transceivers, thereby allowing them to communicate with multiple access points 406 (or different radios of the same access point). This allows a given mobile robot 404 to leverage multiple communication paths with the backend infrastructure.

As noted above, non-traditional deployment locations for wireless networks, such as in the examples of FIGS. 3-4, typically experience conditions that are not present in more traditional locations, such as office buildings, schools, etc. Indeed, non-traditional wireless network deployments may be subject to various conditions that can affect the radio frequency (RF) signals in the area. For instance, the high presence of metal in a mine could lead to severe signal degradation and blockage. In addition, nodes in these networks (e.g., trucks, trains, etc.) may be highly dynamic as they move throughout the area. This can also lead to signal fading and congestion due to interference. In extreme cases, the environmental factors can impinge on the wireless communications to such a degree that the controlled process is interrupted. Indeed, if a controlled node is unable to communicate with the wireless network, that node will be unable to receive control commands or report data back to its supervisory service.

Of course, the non-traditional environments in FIGS. 3-4 are exemplary only and the techniques introduced herein may be applied to any number of other forms of network deployments. For instance, the techniques herein may be used within other non-traditional deployment locations, such as railways, roadways, runways, factories, and the like, where RF conditions may compromise the reliability of the network, as well as in traditional deployment locations, as desired.

Forward error correction (FEC) encoding is a mechanism that can help to mitigate the effects of losses during communication. Generally speaking, FEC encoding operates by adding redundant information into the stream of data for a message. As a result, the entirety of the message can be reconstructed at the receiver side, even if part of the stream is lost during transmission. Example FEC encoding approaches include block codes, which are applied to blocks of bits or symbols of fixed sizes (e.g., packets, etc.), and convolutional codes, which work on streams of bits or symbols of arbitrary length.

Typically, FEC encoding is applied to wireless communications at the physical (PHY)-layer of the Open Systems Interconnection (OSI) model. As would be appreciated, the OSI model generally includes the following layers:

Layer 1: Physical (PHY) Layer
Layer 2: Data Link Layer
Layer 3: Network Layer
Layer 4: Transport Layer
Layer 5: Session Layer
Layer 6: Presentation Layer
Layer 7: Application Layer ——Application of Network Layer FEC During Predicted Network Events——

The techniques herein introduce a network-layer FEC encoding mechanism, to improve the reliability of wireless communications in a network, particularly those in non-traditional wireless networks with mobile nodes. Such network-layer FEC encoding may be performed in conjunction with any FEC encoding applied at a lower layer, such as at the PHY or data link layer, in some embodiments. In some aspects, the application of the network-layer FEC encoding may be adaptive in nature, being applied only during the occurrence of a predicted event that could impinge on the wireless communications of a mobile node in the wireless network.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein.

Specifically, according to various embodiments, a controller predicts an occurrence of an event in a wireless network, based in part on a movement of a mobile node of the wireless network. The controller initiates application of network-layer forward error correction encoding to a stream of packets to be sent during the event between the mobile node and an access point of the wireless network, to form one or more encoded packets. The controller causes the one or more encoded packets to be transmitted in conjunction with the stream of packets during the event. The controller ceases application of the network-layer forward error correction encoding after the event has occurred.

Operationally, FIGS. 5A-5D illustrate an example of using network-layer forward error correction (FEC) encoding during an event, according to various embodiments. As shown, assume that a wireless network 500 includes a mobile node 502 that traverses a physical area at a speed/velocity v. Accordingly, the movement information for mobile 502 may be represented as one or more time series, such as a time series that tracks the geo-locations of mobile node 502 over time, the speeds/velocities of mobile node 502 over time, etc.

Figure 5A:
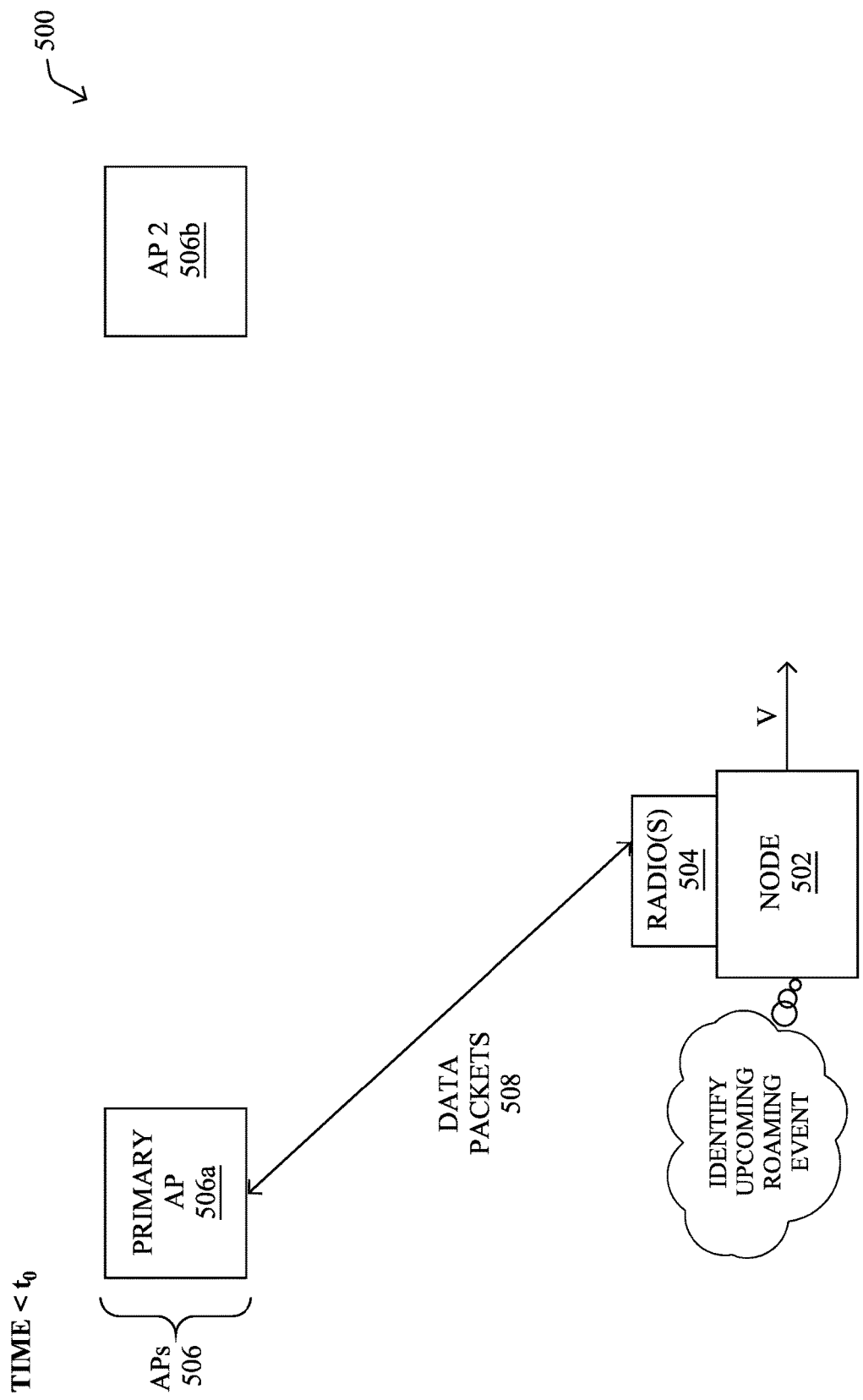

As mobile node 502 travels, it may form links with any number of APs 506, such as a primary AP 506a, a second AP 506b, etc. For instance, as shown in FIG. 5A, assume that mobile node 502 includes radio(s) 504, at least one of which is currently attached to AP 506a. This allows data packets 508 to be conveyed between AP 506a and mobile node 502. For instance, data packets 508 may include user traffic, if mobile node 502 is a vehicle, control traffic for mobile node 502 or another device in the network, telemetry or sensor data collected by mobile node 502 or another node in the network, etc.

According to various embodiments, a controller (e.g., a device 200) that is resident on mobile node 502, any of APs 506, or in communication therewith (e.g., a gateway for wireless network 500, etc.) may predict the occurrence of a network event that may impinge on the transmission of data packets 508. Such events may include, but are not limited to, any or all of the following:

Mobile node 502 entering a location with poor signal quality (e.g., high interference, low RSSI, etc.), such as due to environmental conditions (e.g., a high presence of metal, a turn in a pathway, etc.).

The channel quality/RSSI that mobile node 502 is likely to encounter falling below a defined threshold.

A time of day during which signal quality is typically reduced (e.g., due to a high density of nodes in a given area, etc.).

Mobile node 502 roaming from one AP to another, such as from AP 506a to AP 506b. Indeed, as mobile node 502 travels farther away from AP 506a, it is likely to experience a degradation of its signal with AP 506a, while its initial signals with AP 506b will be of lower quality.

To make its predictions, the controller may take into account the movement of mobile node 502 (e.g., its geo-locations, speeds/velocities, etc.), a time of day, an access point identifier associated with the AP(s) within range of the mobile node, channel-in-use information, data rate-in-use information, combinations thereof, or the like. For instance, such information may be associated with channel quality/RSSI measurements or other labeled data and used as training data for a prediction model that predicts the occurrence of any of the above events. In various embodiments, the prediction model may be a machine learning, statistical, or heuristics-based model, that may be dependent on the specific deployment of wireless network 500.

For illustration of the techniques herein, let the start time of the event be denoted to and the end time of the event denoted as $t_{end}$. Note that these parameters may also be configured so as to provide a time buffer before and/or after the times during which the signal quality is likely to be reduced. For instance, for an event associated with a mobile node entering a location with high interference, the start time for the event may be set to a certain time before the mobile node actually enters the location. Similarly, the start and/or end times for an event associated with a mobile node roaming from one AP to another may include buffer times before and/or after the mobile node actually initiates or completes its roaming operations. As would be appreciated, while the techniques herein are described with respect to start and end times, the actual parameters used could equally be implemented as geo-locations. In such cases, the times may be viewed as times at which the mobile node is present at certain locations.

As shown in FIG. 5A, assume that mobile node 502 is a train that travels along a railway and passes 506a. From its prior trips along the railway, telemetry data may be collected regarding its communications along that stretch and a controller onboard mobile node 502 may predict that mobile node 502 will soon roam from AP 506a to AP 506b. In other words, an event is soon to occur that may impact the transmission of data packets 508 between mobile node 502 and the APs 506 of wireless network 500.

In various embodiments, the controller may initiate application of network-layer FEC encoding to the stream of data packets during the predicted event and cause the resulting encoded packets to be sent in conjunction with the data packets. Note that this FEC encoding may also be applied in addition to any encoding that is performed at other layers, such as at the PHY layer, application layer, or the like.

Figure 5B:
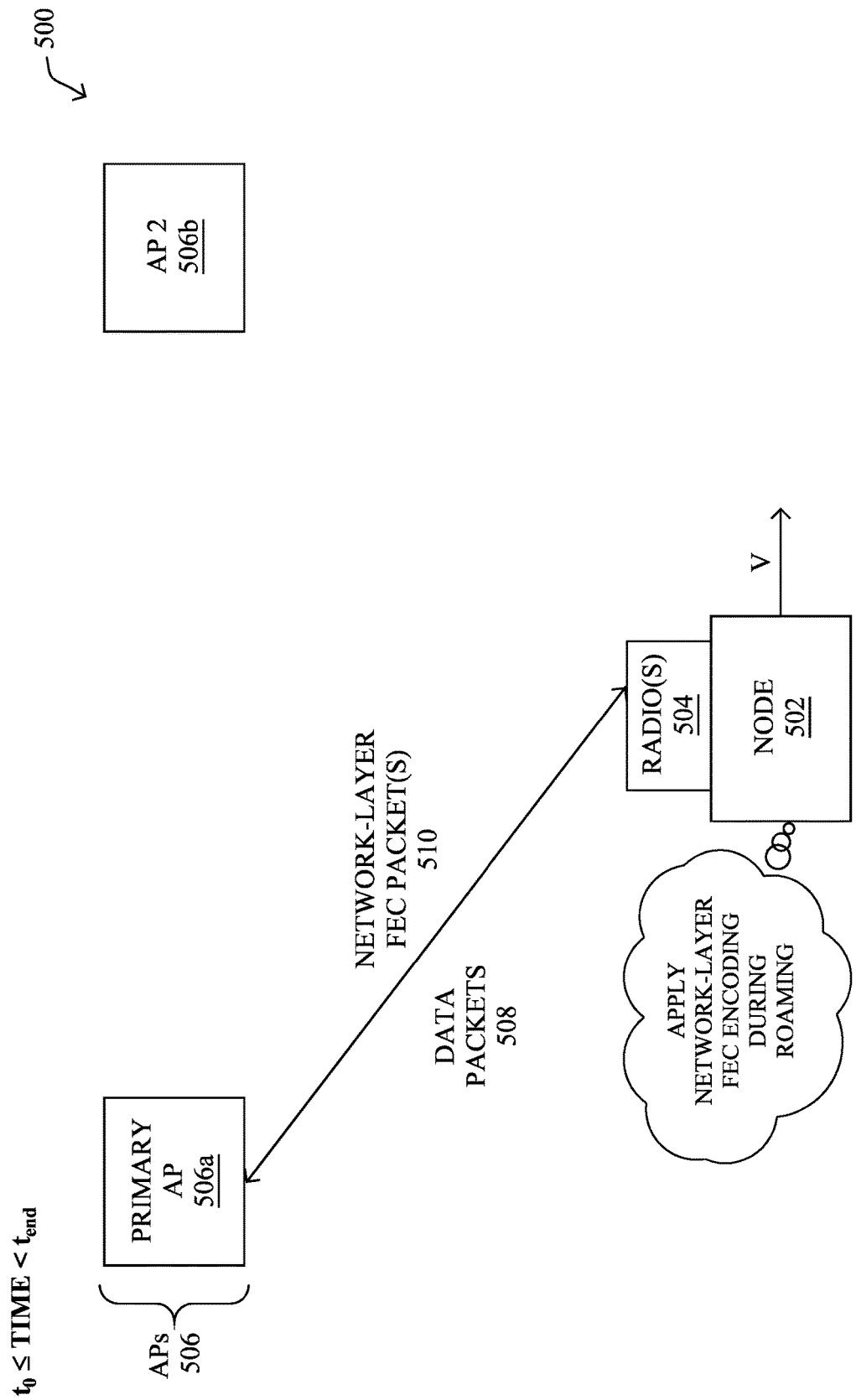

For instance, as shown in FIG. 5B, mobile node 502 may begin applying network-layer FEC encoding to data packets 508, to form network-layer FEC encoded packet(s) 510, and begin sending them to AP 506a in conjunction with data packets 508. In cases in which mobile node 502 includes multiple radio(s) 504, further embodiments provide for encoded packet(s) 510 to be sent on a different channel than that of data packets 508, such as to a different radio of AP 506a, to a different AP than that of AP 506a (e.g., AP 506b or another AP in range), or the like. Active probing techniques can also be used, in some instances, prior to performing the handoff, to allow the intended receiver to anticipate the receipt of the network-layer FEC encoded packet(s) 510.

In some embodiments, as shown in FIG. 5C, the controller may continue the application of network-layer FEC encoding to data packets 508 for a period of time, even after mobile node 502 has associated with AP 506b and/or has dropped its connection with AP 506a. In turn, mobile node 502 may begin sending the encoded packets 510 in conjunction with data packets 508 to AP 506b. Thus, even though mobile node 502 has completed its roaming operation, the end of the network event may be set to be at a time thereafter.

In FIG. 5D, once the event has occurred/ended, the controller may cease the network-layer FEC encoding of data packets 508 and the sending of encoded packet(s) 510. By limiting the use of network-layer FEC encoding only to certain times, this can help to reduce the resulting overhead that results from sending the redundant information (e.g., additional bandwidth consumption). In addition, by sending the redundant information via encoded packet(s) 510, this allows the receiver to reconstruct any of data packets 508 that may have been lost during transmission (e.g., by using FEC decoding on the received packets).

As would be appreciated, while the prediction and encoding mechanisms are described in FIGS. 5A-5D primarily from the standpoint of mobile node 502, the adaptive network-layer FEC encoding mechanisms herein could also be applied at the infrastructure side (e.g., the side of APs 506) in conjunction therewith, or in lieu of, such as when data is only being transmitted to mobile node 502 during the predicted event.

Figure 6:
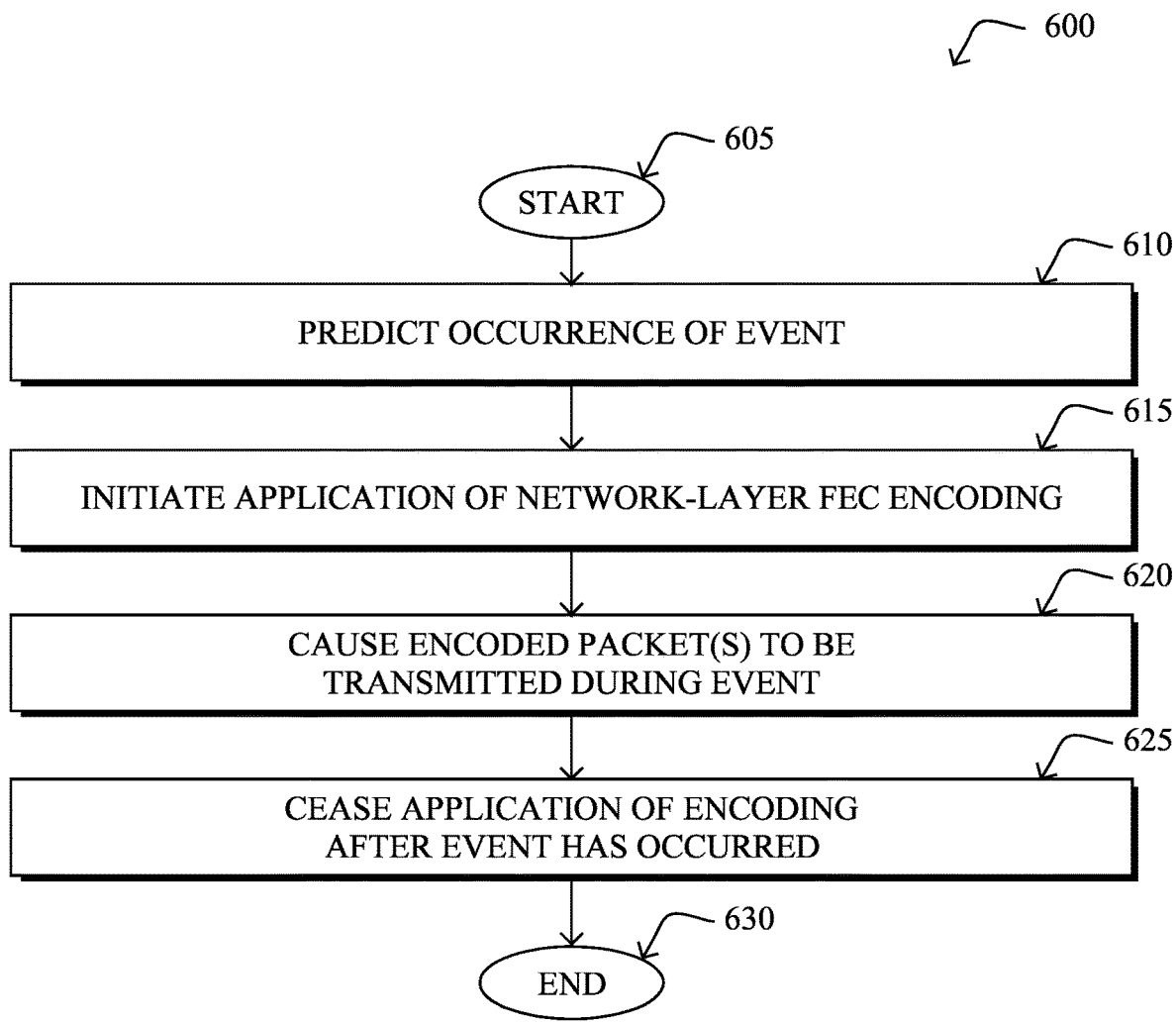
FIG. 6 illustrates an example simplified procedure for using network-layer FEC encoding to communicate in a wireless network.

FIG. 6 illustrates an example simplified procedure for using network-layer FEC encoding to communicate in a wireless network, in accordance with one or more embodiments described herein. The procedure 600 may start at step 605, and continues to step 610, where, as described in greater detail above, a controller (e.g., a device 200) may predict an occurrence of an event in a wireless network. For instance, the controller may be a component of the mobile node (e.g., a robot, vehicle, etc.), an access point in the wireless network, or another device in communication therewith. In various embodiments, the event may comprise an RSSI between the mobile node an AP dropping below a threshold level, the mobile node roaming from the AP to a second AP, or a packet loss metric exceeding an acceptable threshold.

In various embodiments, the controller may base its prediction in part on a movement of the mobile node (e.g., its geo-locations, velocity/speed, etc.), a time of day, an access point identifier associated with the AP(s) within range of the mobile node, channel-in-use information, data rate-in-use information, combinations thereof, or the like. For instance, in one embodiment, the controller may use a history of this information to train a prediction model that is able to predict occurrences of the event.

At step 615, as detailed above, the controller may initiate application of network-layer FEC encoding to a stream of packets to be sent during the event between the mobile node and an AP, to form one or more encoded packets. In some embodiments, application of the network-layer FEC encoding may be performed in conjunction with other FEC mechanisms that may be applied at different layers (e.g., PHY-layer FEC, application-layer FEC, etc.).

At step 620, the controller may cause the one or more encoded packets to be transmitted in conjunction with the stream of packets during the event, as described in greater detail above. For instance, in the case in which the event comprises the mobile node roaming from a first AP to a second AP, the controller may cause the network-layer FEC packet(s) generated via step 615 to be sent with the communications between the mobile node and the first AP, with the communications between the mobile node and the second AP, or both. Said differently, network-layer FEC encoded packets may be sent over the initial link, prior to the mobile node switching over to the new link, and/or over the new link, such as for a predefined amount of time or when the mobile node reaches a predefined or distance to the second AP.

At step 630, as detailed above, the controller may cease application of the network-layer FEC encoding after the event has occurred. In other words, once an end condition for the event has been met, the controller may disable the network-layer FEC encoding used for regular communications between the wireless network and the mobile node. Indeed, network-layer FEC encoding increase the resource consumption (e.g., bandwidth usage, etc.) of the network and may not be necessary under all circumstances. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, ensure the reliability of wireless communications in a wireless network through the use of network-layer FEC encoding. In doing so, packets lost during transmission can be reconstructed using the redundant information generated by the network-layer FEC encoding. In addition, the techniques herein are adaptive in nature and may only use this encoding during certain events that may impinge on the wireless communications of a mobile node, such as when the node is roaming from one AP to another, at certain times of day or locations at which interference is at a high point, or the like.

While there have been shown and described illustrative embodiments for using network-layer FEC encoding a wireless network, it is to be understood that various other adaptations and modifications may be made within the intent and scope of the embodiments herein. For example, while the techniques herein are described with respect to certain types of wireless networks, the techniques herein are not limited as such and can be used in any other form of wireless network, as desired. Further, while certain protocols are used herein for illustrative purposes, the techniques herein can also be implemented using other suitable protocols, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
predicting, by a controller, an occurrence of an event in a wireless network, based in part on a movement of a mobile node of the wireless network;
initiating, by the controller, application of network-layer forward error correction encoding to a stream of packets to be sent during the event between the mobile node and an access point of the wireless network, to form one or more encoded packets;
causing, by the controller, the one or more encoded packets to be transmitted in conjunction with the stream of packets during the event; and
ceasing, by the controller, application of the network-layer forward error correction encoding after the event has occurred.

2. The method as in claim 1, wherein the controller predicts the occurrence of the event based in part on a time of day.

3. The method as in claim 1, wherein the event comprises a received signal strength indicator (RSSI) between the mobile node and the access point dropping below a threshold level.

4. The method as in claim 1, wherein the event comprises the mobile node roaming from the access point to a second access point in the wireless network.

5. The method as in claim 4, further comprising:
causing, by the controller, network-layer forward error correction encoding to be applied to packets sent between the mobile node and the second access point during the event.

6. The method as in claim 4, wherein the event ends when the mobile node reaches a predefined location or distance to the second access point.

7. The method as in claim 4, wherein the event ends at a predefined amount of time after the mobile node has associated with the second access point.

8. The method as in claim 1, wherein the event comprises a predicted packet loss metric exceeding a threshold.

9. The method as in claim 1, wherein the controller predicts the occurrence of the event based in part at least one of: an access point identifier associated with the access point, channel-in-use information, or data rate-in-use information.

10. The method as in claim 1, wherein the controller predicts the occurrence of the event based in part on a geo-location of the mobile node or a speed of the mobile node.

11. An apparatus, comprising:
one or more network interfaces;
a processor coupled to the one or more network interfaces and configured to execute one or more processes; and
a memory configured to store a process that is executable by the processor, the process when executed configured to:
predict an occurrence of an event in a wireless network, based in part on a movement of a mobile node of the wireless network;
initiate application of network-layer forward error correction encoding to a stream of packets to be sent during the event between the mobile node and an access point of the wireless network, to form one or more encoded packets;
cause the one or more encoded packets to be transmitted in conjunction with the stream of packets during the event; and
cease application of the network-layer forward error correction encoding after the event has occurred.

12. The apparatus as in claim 11, wherein the apparatus predicts the occurrence of the event based in part on a time of day.

13. The apparatus as in claim 11, wherein the event comprises a received signal strength indicator (RSSI) between the mobile node and the access point dropping below a threshold level.

14. The apparatus as in claim 11, wherein the event comprises the mobile node roaming from the access point to a second access point in the wireless network.

15. The apparatus as in claim 14, wherein the process when executed is further configured to:
cause network-layer forward error correction encoding to be applied to packets sent between the mobile node and the second access point during the event.

16. The apparatus as in claim 14, wherein the event ends when the mobile node reaches a predefined location or distance to the second access point.

17. The apparatus as in claim 14, wherein the event ends at a predefined amount of time after the mobile node has associated with the second access point.

18. The apparatus as in claim 11, wherein the event comprises a predicted packet loss metric exceeding a threshold.

19. The apparatus as in claim 11, wherein the mobile node comprises the apparatus.

20. A tangible, non-transitory, computer-readable medium storing program instructions that cause a controller to execute a process comprising:
predicting, by the controller, an occurrence of an event in a wireless network, based in part on a movement of a mobile node of the wireless network;
initiating, by the controller, application of network-layer forward error correction encoding to a stream of packets to be sent during the event between the mobile node and an access point of the wireless network, to form one or more encoded packets;
causing, by the controller, the one or more encoded packets to be transmitted in conjunction with the stream of packets during the event; and
ceasing, by the controller, application of the network-layer forward error correction encoding after the event has occurred.

* * * * *

UNITED STATES PATENT AND TRADEMARK OFFICE
CERTIFICATE OF CORRECTION

PATENT NO. : 11,606,264 B2
APPLICATION NO. : 17/210953
DATED : March 14, 2023
INVENTOR(S) : Alessandro Erta It is certified that error appears in the above-identified patent and that said Letters Patent is hereby corrected as shown below:

In the Specification

Column 9, Line 66, please amend as shown:
of the event be denoted $t_0$ and the end time of the event Signed and Sealed this
Thirteenth Day of June, 2023

Katherine Kelly Vidal
*Director of the United States Patent and Trademark Office*